United States Patent [19]

Gemignani

[11] Patent Number: 4,522,369
[45] Date of Patent: Jun. 11, 1985

[54] PILOT-CONTROLLED SAFETY VALVE

[76] Inventor: André Gemignani, Avenue Allende,, Martigue (Bouches-du-Rhone), France

[21] Appl. No.: 523,696
[22] Filed: Aug. 16, 1983

[30] Foreign Application Priority Data

Aug. 17, 1982 [FR] France .................. 82 14491

[51] Int. Cl.³ .................................... F16K 31/126
[52] U.S. Cl. ................... 251/61.5; 137/492; 137/528
[58] Field of Search ............ 137/488, 492, 492.5, 137/528, 529; 251/61, 61.1, 61.2, 61.3, 61.4, 61.5

[56] References Cited

U.S. PATENT DOCUMENTS 2,679,259  5/1954  Haeberlein .................. 251/61.4
4,200,116  4/1980  Gemignani .................. 137/492

FOREIGN PATENT DOCUMENTS 1041413  10/1953  France .................. 251/61.5

Primary Examiner—Robert G. Nilson
Attorney, Agent, or Firm—Karl F. Ross; Herbert Dubno

[57] ABSTRACT

A safety valve for walls and other vessels and adapted to vent the vessel to the atmosphere upon the development of a predetermined maximum pressure in the vessel comprises a step plunger carrying a valve member and adapted to displace the valve member toward and away from a seat in a valve housing in which a command chamber is defined between an axial guide for the plunger and an end thereof. The command chamber is controlled by the pressure from the pilot device and the blocks surrounding this axial guide and is connected to the plunger so that the sealing is effected by the bellows and the guide does not need to have a sealing capability.

5 Claims, 4 Drawing Figures

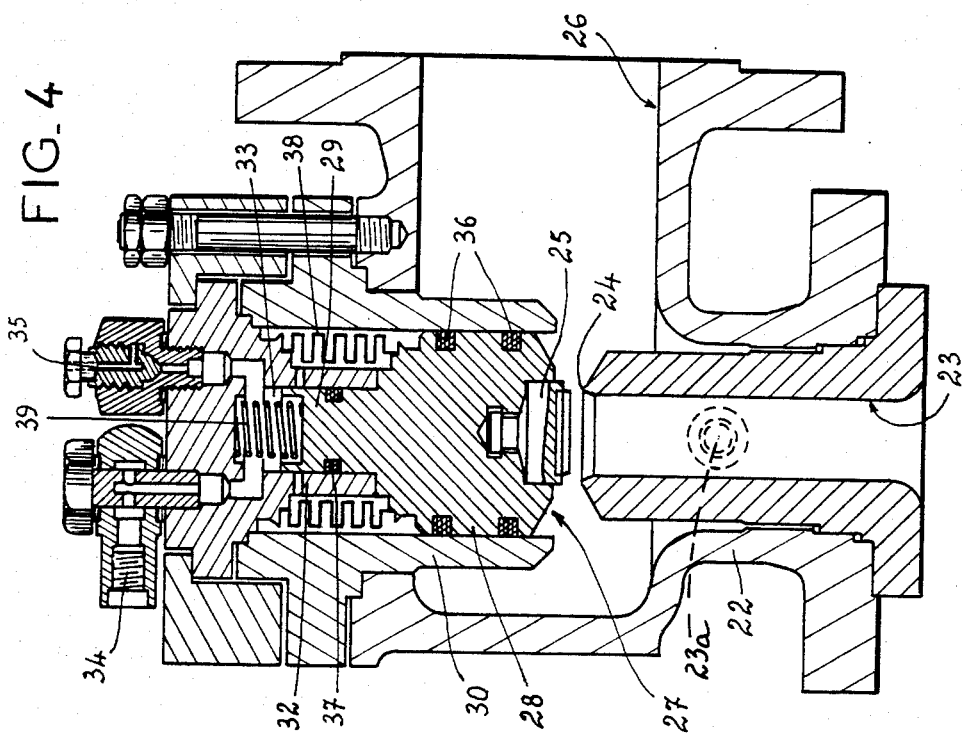
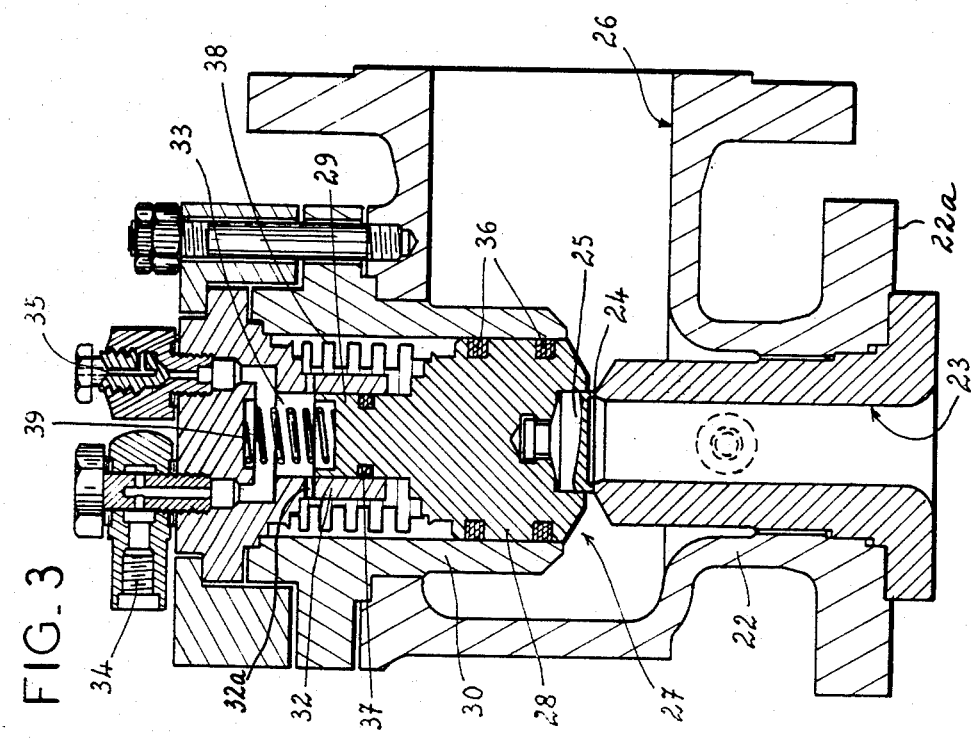

PILOT-CONTROLLED SAFETY VALVE

FIELD OF THE INVENTION

My present invention relates to a pilot-controlled safety valve and, more particularly, to a safety valve of the type in which a passage venting a pressure vessel can be unblocked by a valve member in response to a pilot pressure which is determined by the pressure in the vessel so that the valve will open when the pressure in the vessel reaches a predetermined maximum threshold.

BACKGROUND OF THE INVENTION

Valves of the type under discussion are described in U.S. Pat. Nos. 4,200,116 and 4,291,721 as well as in Ser. No. 341,829 filed Jan. 22, 1982 and the art of record in these cases.

It is imperative to equip an apparatus or circuit containing a fluid under pressure, for instance a boiler, with a safety valve adapted to vent the volume which is to be protected into the atmosphere when the fluid pressure attains a predetermined maximum value beyond which a pressure increase might be dangerous to equipment or personnel or to the environment.

Boilers of the type which must be protected with such safety valves include industrial, ship and power plant boilers and the fluid pressure vessels of nuclear reactors and the like.

A pilot-controlled valve generally comprises a valve body mounted along a passage connecting the vessel with the ambient atmosphere, a valve member mounted in this body for movement toward and away from a valve seat and a piston-and-cylinder arrangement generally surmounting this body and having a piston connected to the valve member and responding to a pilot pressure for biasing the valve member into its closed position at vessel pressures below the predetermined level while enabling displacement of the valve member into an open position when the vessel pressure reaches the predetermined level to relieve the pressure in the vessel by venting the latter to the atmosphere.

Because of the need of a piston-and-cylinder arrangement in addition to the valve body and valve member, this system is relatively complex and the complexity is enhanced by the need for thermal barriers, sliding seals and like elements which are required because of the actuating system provided for the valve member.

The reliability of the valve often is cast into doubt because of the frictional resistance to movement of the valve member and the need for considerable pressure when the valve member is in its normal position, i.e. is closed.

The problem of venting the cylinder also arises in this system which may not be as compact as is desired because of the additional structure which must be mounted upon the valve housing.

While a pilot-controlled safety valve is known which utilizes an internal cylinder and which is far more compact than the external cylinder valve previously described, most of the other disadvantages described above remain, especially when the device is used at high temperatures.

OBJECTS OF THE INVENTION

It is the principal object of the present invention to provide a pilot-controlled valve which is free from the drawbacks of the earlier systems described.

Still another object of this invention is to provide a safety valve which is more compact and reliable than earlier safety valves and particularly those discussed earlier.

A further object of this invention is to provide a pilot-controlled safety valve which affords more reliable closure at lower pilot pressures than earlier devices and which especially manifests a high degree of reliability even when operating at elevated pressures.

SUMMARY OF THE INVENTION

These objects and others which will become apparent hereinafter are attained, in accordance with this invention, in a pilot-controlled safety valve in which, within the housing of the valve member, a carrier is provided for this valve member, the carrier defining a chamber within the housing which can be supplied with fluid under pressure by the pilot device. The support element for the valve member forms a movable wall for the command chamber and is connected to one end of a metal bellows whose other end is sealingly connected to the valve body, means being provided for axially guiding the support element on this body.

With this structure the bellows can define a greater area of the support element which is exposed to the pilot pressure so that with comparatively small pilot pressures large forces can be generated to hold the valve in its closed position.

The support element for the valve can be guided in the body without necessarily requiring that the guiding elements form the pressure-retentive seals since the true fluid sealing can be effected by the bellows whose opposite ends are fixed to the housing and the movable support element. In other words the bellows separates the fluid contained in the command chamber from the fluid which may be vented or discharged through the valve from the vessel to be protected.

Under normal conditions, the valve is closed and the force exerted within the chamber and the bellows on the support element is greater than the force exerted by the fluid within the vessel on the valve member, thereby ensuring that the valve member will be retained against the seat. When the pressure within the vessel, i.e. in the space to be protected, becomes greater than the predetermined value, the pilot device no longer feeds fluid under pressure to the command chamber which can then be vented to the atmosphere or to a low pressure space and the force applied to the valve member in the valve-closing direction is mechanically reduced so that the valve member is urged into its open position by the fluid within the protected space with compression of the bellows and any spring which may assist the fluid force in the command chamber to hold the valve member closed.

The system of the invention has numerous advantages.

Firstly, the device is extremely compact since the need for a cylinder is eliminated and, obviously, there is no need for a structure equivalent to a hydraulic or pneumatic cylinder surmounting the valve body.

Because of the absence of sliding seals, friction is minimized and indeed can be completely eliminated so that the response of the valve is excellent and the longterm reliability of the valve and its ability to respond to excessive pressures are enhanced. With the valve of the invention, thermal barriers hitherto required can be avoided. The sole limit to the working temperature is the ability of the structure described to withstand it and hence the working temperature can exceed 600° C.

Of considerable importance is the fact that the valve of the invention can utilize a standard valve body.

According to an embodiment of the invention, the support element for the valve member is a stepped plunger which is guided axially in the valve body and preferably within a sleeve surrounding the axis of the valve member. This plunger has a large diameter portion turned toward the valve seat and receiving the valve member and a small cross section portion or step turned away from the valve seat, guided in the sleeve and enclosed in the bellows. The sleeve or tubular portion of the housing thus projects coaxially with the small cross section portion of the plunger into the bellows and is surrounded thereby.

This sleeve or tubular part of the housing can define the command chamber and the valves can be affixed to the valve body around the sleeve and to the large diameter step of the support element around the small diameter step. Preferably the bellows is fixed to the support element in a zone between the two steps and in a space defined between the tubular portion or sleeve and the outer bore of the support body in which the support element is guided.

The bellows is not exposed to the flow of fluid at high temperature from the boiler or the protected space since it is received in the bore or tubular portion of the housing in which the large diameter portion of the support element is guided and thus is not exposed to severe temperature and pressure conditions and is free from thermal or mechanical shock.

Segments or rings can be utilized to guide the support element axially and need not have a sealing function so that the tendency toward deterioration of these segments is reduced. Since the sealing is afforded by the bellows, even with such deterioration the device is not rendered inoperative or dangerous.

BRIEF DESCRIPTION OF THE DRAWING

The above and other objects, features and advantages of the present invention will become more readily apparent from the following description, reference being made to the accompanying drawing in which:

FIG. 3 is an axial section through a valve according to the invention which can be substituted for the safety valve of FIG. 1 in a pilot-controlled system; and FIG. 4 is an axial section similar to FIG. 3 but showing the valve member thereof in another position.

SPECIFIC DESCRIPTION

Figure 1:
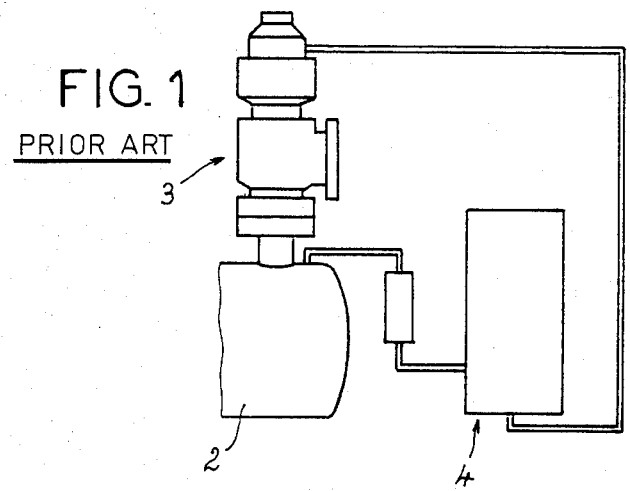
FIG. 1 is a diagram illustrating a pilot-controlled safety system utilizing a prior art safety valve (see U.S. Pat. No. 4,200,116)
Figure 2:
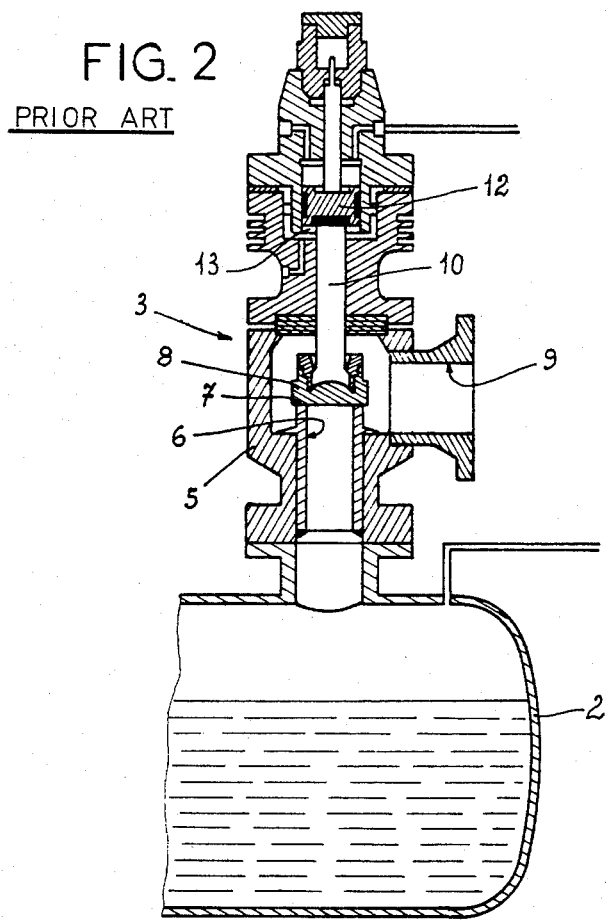
FIG. 2 is an axial section through this valve.

From FIGS. 1 and 2 which represent the prior art, it will be apparent that the vessel 2 to be protected against excess pressures can be surmounted by a safety valve 3 which is controlled by a pilot valve system 4, e.g. of the type described in the aforementioned patents. The pilot valve system responds to the pressure within the vessel 2 and delivers a pressure to the safety valve which is relaxed when the pressure within the vessel 2 reaches a predetermined level to allow the safety valve to vent.

The most typical external cylinder construction of the safety valve has been represented schematically in FIG. 2 from whence it may be seen that the valve 3 comprises a valve body or housing 5 connected to the vessel 2 and defining a vessel 6 which communicates with an orifice opening into the atmosphere. The passages are formed with a valve seat 7, normally closed by a valve member 8. The valve member 8 is carried by the lower end of a piston rod 10 slidable in the housing and at the upper end of which a command piston 12 is provided. The command piston 12 is mounted in a cylinder 13 and the assembly 12, 13 forms a piston-and-cylinder arrangement which is mounted upon the body 5. The cylinder is connected to the pilot valve 4 to respond to the pilot pressure.

Not only is this system awkward because the cylinder surmounts the valve body but the sliding parts including member 10 must simultaneously form seals preventing pressure losses with all of the disadvantages described.

The valve of FIGS. 3 and 4 of the present invention is intended to replace the valve 3 of FIGS. 1 and 2 in a pilot controlled safety valve system. More particularly, the valve body 22 can be provided with a flange 22a which enables this valve body or housing to be secured to the flange of an outer fitting of the vessel 2.

Within the valve housing, a tubular member 23 can be secured by a setscrew 23a shown only in broken lines in FIGS. 3 and 4 and threaded into the housing 22 from the opposite side of the structure illustrated. The tubular member 23 is formed at its upper end with a seat 24 engageable by a seal of a valve member 25 mounted at the lower end of a support element 27. The support element 27 carrying the valve member 25 is a step plunger having a large diameter step 28 and a small diameter step 29. The large diameter step 28 is located at the side of the plunger carrying the valve member 25 and confronting the seat 24.

The valve body or housing 22 is formed with a sleeve 30 whose internal bore forms an axial guide for the large diameter section 28 and within this sleeve a tubular member 32 extends to form a guide for the small diameter section 29.

The sleeve 32 defines with the upper end of the support element 27 a command chamber 33 which communicates with a fitting 34 connected to the pilot valve 4. A spring 39 is seated against the valve housing at one end and against the support element 27 at its other end and biases the support element toward the valve seat 24. A purge orifice closed by a screw 35 is also provided. The large diameter section 38 is provided with guide rings 36 which can be self-lubricating, e.g. impregnated with graphite, for slidable guidance on the wall of the bore of the sleeve 30 while the small diameter section 29 can have a similar ring 37 slidably guided along the wall of the bore of slide 32. The self-lubricating guide rings need not form seals and can be simple low-friction members.

When these rings are graphitized the danger of seizure is eliminated even when the valve is used for hot liquids.

A metal bellows 38 is disposed in the annular space between the wall of the bore of sleeve 30 and the sleeve 32 and is fixed at one of its ends to a shoulder between the two steps of the support element 27.

The other end of the bellows 38 is fixed to the valve housing or body. Bores 32a can connect the command chamber 33 with the space within th bellows 38.

In operation, in the absence of significant pressure in the vessel 2 and even in the absence of significant pilot pressure in the command chamber 33, the valve member 35 is biased into its closed position against the seat 34 by the spring 39. As the pressure builds up in the vessel 2, the pilot valve pressure increases as well and the pressure in command member 33 augmented by the pressure in the valves 38, applies sufficient force to hold the valve closed against the build-up of pressure in the vessel 2. When the vessel 2 exceeds the predetermined level, the pilot valve relieves the pressure in command chamber 33 and the upward force applied to the valve member 25 opens the valve by displacing the unit 27 upwardly (FIG. 4) to permit the pressure to be vented from the vessel 2 while the valve is compressed. The purge of valve 25 can be used to vent the command chamber 33 or admit air thereto as may be required, under manual control.

I claim:

1. A pilot-controlled safety valve for the protection of a vessel by venting pressure therefrom at a predetermined maximum level, said valve comprising:
   a valve housing connected to said vessel and formed with a valve passage communicating therewith;
   a valve seat formed along said passage;
   a valve member movable along an axis toward and away from said seat for selectively blocking and unblocking said passage;
   a support element carrying said valve member and guided in said housing for movement along said axis;
   a metal bellows sealingly connected to said support element and to said housing, said support element forming a command chamber with said housing; and
   means connecting said command chamber to said vessel, thereby enabling the displacement of said support element and said valve member, said support element being stepped and having a large section turned toward said seat and a small section turned away from said seat, said housing having a pair of sleeves each axially guiding one of said sections, said bellows being received between said sleeves.

2. The valve defined in claim 1 wherein said support element is provided with a shoulder between said sections, said bellows sealingly engaging said shoulder.

3. The valve defined in claim 2 wherein the sleeve axially guiding said small section is an inner sleeve defining with said small section said command chamber, said inner sleeve provided with at least one bore communicating between said command chamber and the interior of said valve.

4. The valve defined in claim 3 wherein said valve housing is provided with a tubular member defining said passage and said seat and coaxial with said sleeves and said support element.

5. The valve defined in claim 3 wherein each of said sections is provided with nonsealing antifriction guide segments engaging the respective sleeve.

* * * * *